US009736697B2

(12) United States Patent
Park et al.

(10) Patent No.: US 9,736,697 B2
(45) Date of Patent: *Aug. 15, 2017

(54) METHOD AND APPARATUS FOR DYNAMIC FREQUENCY SELECTION IN WIRELESS LOCAL AREA NETWORK SYSTEM

(71) Applicant: LG ELECTRONICS INC., Seoul (KR)

(72) Inventors: Jong Hyun Park, Anyang-si (KR); Ill Soo Sohn, Anyang-si (KR); Eun Sun Kim, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,076

(22) Filed: Dec. 11, 2015

(65) Prior Publication Data

US 2016/0100317 A1 Apr. 7, 2016

Related U.S. Application Data

(63) Continuation of application No. 13/572,023, filed on Aug. 10, 2012.

(Continued)

(51) Int. Cl.
*H04W 16/10* (2009.01)
*H04W 16/14* (2009.01)
(Continued)

(52) U.S. Cl.
CPC ............. *H04W 16/10* (2013.01); *H04L 43/12* (2013.01); *H04W 16/14* (2013.01); *H04W 24/08* (2013.01); *G01S 7/021* (2013.01); *H04W 84/12* (2013.01)

(58) Field of Classification Search
None
See application file for complete search history.

(56) References Cited

U.S. PATENT DOCUMENTS

2002/0188723 A1\* 12/2002 Choi ...................... H04W 36/06
709/225
2005/0111415 A1\* 5/2005 Soomro ................ H04W 24/00
370/338

(Continued)

FOREIGN PATENT DOCUMENTS

CN 1640077 A 7/2005
JP 2011-15048 A 1/2011
(Continued)

OTHER PUBLICATIONS

"IEEE Standard for Information technology—Telecommunications and Information exchange between systems—Local and metropolitan area networks—Specific requirements"; IEEE Computer Society; Jun. 12, 2007; 1232 pages.

(Continued)

*Primary Examiner* — Adnan Baig
(74) *Attorney, Agent, or Firm* — Birch, Stewart, Kolasch & Birch, LLP

(57) ABSTRACT

A method for a wireless local area network performed by an access point (AP) configured to communicate over a primary subchannel and a secondary subchannel. The AP transmits a frame including a quiet channel element to a receiving station. The quiet channel element indicates that the secondary subchannel is to be quieted during a quiet interval in which the AP tests the secondary subchannel for a presence of radar transmissions and the receiving station does not send any frame to the AP. The quiet channel element includes an AP quiet mode field indicating whether a communication to the AP is allowed within the primary subchannel during the quiet interval. The primary subchannel (Continued)

and the secondary subchannel are quieted during the quiet interval if the AP quiet mode field indicates the communication to the AP is not allowed with the primary subchannel during the quiet interval.

6 Claims, 16 Drawing Sheets

Related U.S. Application Data

(60) Provisional application No. 61/538,094, filed on Sep. 22, 2011, provisional application No. 61/536,049, filed on Sep. 19, 2011, provisional application No. 61/522,681, filed on Aug. 11, 2011.

(51) Int. Cl.
  H04L 12/26 (2006.01)
  H04W 24/08 (2009.01)
  H04W 84/12 (2009.01)
  G01S 7/02 (2006.01)

(56) References Cited

U.S. PATENT DOCUMENTS

| | | | |
|---|---|---|---|
| 2009/0042510 A1* | 2/2009 | Lee | H04W 24/10 455/39 |
| 2010/0304772 A1* | 12/2010 | Wang | H04W 56/003 455/509 |
| 2011/0096739 A1* | 4/2011 | Heidari | H04W 72/085 370/329 |
| 2011/0255401 A1 | 10/2011 | Seok | |
| 2012/0069746 A1* | 3/2012 | Park | H04W 72/082 370/252 |
| 2012/0163354 A1 | 6/2012 | Stacey et al. | |
| 2013/0176980 A1 | 7/2013 | Kneckt et al. | |

FOREIGN PATENT DOCUMENTS

| | | |
|---|---|---|
| KR | 10-2010-0072687 A | 7/2010 |
| WO | WO 03/077482 A1 | 9/2003 |
| WO | WO 2010/074471 A2 | 7/2010 |
| WO | WO 2011/029821 A1 | 3/2011 |

OTHER PUBLICATIONS

Park et al., "D1.0 Comment Resolution—Quiet Element," IEEE P802.11 Wireless LANs, doc.: IEEE 802.11-11/1322r12, Sep. 20, 2011, pp. 1-7.

Shukla, "DFS Procedures in Mesh Network," IEEE P802.11 Wireless LANs, doc.: IEEE 802.11-09/0508r00508r0, Apr. 21, 2009, pp. 1-3.

* cited by examiner

FIG. 6

| Element ID | Length | Quiet Count | Quiet Period | Quiet Duration | Quiet Offset |
|---|---|---|---|---|---|
| 1 | 1 | 1 | 1 | 2 | 2 |

Octers:

FIG. 9

| Element ID | Length | AP Status Flag | Quiet Operating Class | Quiet Channel Number |
|---|---|---|---|---|
| 1 | 1 | 1 | 1 | 1 |

These two fields can be repeated (over Quiet Operating Class and Quiet Channel Number)

Octers:

FIG. 10

| Element ID | Length | BSS Usable Channel Width | AP Quiet Mode | Quiet Count | Quiet Period | Quiet Duration | Quiet Offset |
|---|---|---|---|---|---|---|---|
| 1 | 1 | 1 | 1 | 1 | 1 | 2 | 2 |

Octers:

FIG. 11

| Element ID | Length | BSS Usable Channel Width | AP Quiet Mode |
|---|---|---|---|

Octers:    1         1            1              1

FIG. 12

| Element ID | Length | AP Quiet Mode |
|---|---|---|

Octers:  1   1   1

FIG. 13

| Element ID | Length | AP Quiet Mode | Quiet Count | Quiet Period | Quiet Duration | Quiet Offset |
|---|---|---|---|---|---|---|
| 1 | 1 | 1 | 1 | 1 | 2 | 2 |

Octers:

FIG. 14

| B0-B1 | B2-B3 | B4-B6 | B7 |
|---|---|---|---|
| Channel Width | Reserved | Rx Nss | Max Nss For SU Present |

FIG. 15

| B0-B1 | B2 | B3 | B4-B6 | B7 |
|---|---|---|---|---|
| Channel Width | Quiet Type | AP Quiet Mode | Rx Nss | Max Nss For SU Present |

METHOD AND APPARATUS FOR DYNAMIC FREQUENCY SELECTION IN WIRELESS LOCAL AREA NETWORK SYSTEM

CROSS-REFERENCE TO RELATED APPLICATIONS

This is a continuation of U.S. patent application Ser. No. 13/572,023 filed on Aug. 10, 2012, which claims priority under 35 U.S.C. §119(e) to U.S. Provisional Application Nos. 61/538,094 filed on Sep. 22, 2011, 61/536,049 filed on Sep. 19, 2011 and 61/522,681 filed on Aug. 11, 2011, all of which are incorporated by reference in their entirety herein.

BACKGROUND OF THE INVENTION

The present invention relates to wireless communication and, more particularly, to a dynamic frequency selection method in a Wireless Local Area Network (WLAN) system and an apparatus for supporting the same.

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

A lot of standardization tasks are being performed since Institute of Electrical and Electronics Engineering (IEEE) 802 (i.e., the standardization organization of WLAN technology) was established on February, 1980. WLAN technology initially supported a speed of 1 to 2 Mbps through frequency hopping, band spreading, and infrared communication by using a frequency of 2.4 GHz according to IEEE 802.11, but recently may support a maximum speed of 54 Mbps by using Orthogonal Frequency Division Multiplexing (OFDM). In addition, in IEEE 802.11, standardizations for various techniques, such as the improvement of Quality of Service (QoS), Access Point (AP) protocol compatibility, security enhancement, radio resource measurement, wireless access vehicular environments, fast roaming, a mesh network, interworking with an external network, and wireless network management, are being put to practical use or developed.

In IEEE 802.11, IEEE 802.11b supports a maximum communication speed of 11 Mbps while using a frequency of a 2.4 GHz band. IEEE 802.11a commercialized after IEEE 802.11b has further reduced an influence on interference as compared with the frequency of a very confused 2.4 GHz band by using a frequency of a 5 GHz band not the 2.4 GHz band and has improved the communication speed up to a maximum of 54 Mbps using OFDM technology. However, IEEE 802.11a is disadvantageous in that it has a shorter communication distance than IEEE 802.11b. Furthermore, IEEE 802.11g has been in the spotlight considerably because it implements a maximum communication speed of 54 Mbps using the frequency of a 2.4 GHz band and satisfies backward compatibility like IEEE 802.11b. IEEE 802.11a has the advantage over IEEE 802.11a in the communication distance.

Furthermore, in order to overcome a limit to the communication speed that was considered as being weakness in the WLAN, IEEE 802.11n has recently been established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver. Furthermore, this standard may use not only a coding scheme for transmitting several redundant copies in order to increase data reliability, but also Orthogonal Frequency Division Multiplex (OFDM) in order to increase the speed.

As the WLAN is actively propagated and applications employing the WLAN are diversified, there is a recent need for a new WLAN system for supporting a throughput higher than the data processing speed supported by IEEE 802.11n. A Very High Throughput (VHT) WLAN system is one of IEEE 802.11 WLAN systems which are recently proposed in order to support a data processing speed of 1 Gbps or higher.

In IEEE 802.11 TGac that performs the standardization of the VHT WLAN system, active research is being carried out on a scheme using 8×8 MIMO and a channel bandwidth of 80 MHz or higher in order to provide the throughput of 1 Gbps or higher.

If the channel bandwidth of 80 MHz or higher is used, however, interference with other users using the channel bandwidth of 80 MHz or higher may become serious. In order to overcome this problem, a user using the channel bandwidth of 80 MHz or higher must be first protected, or the use of the channel bandwidth may be limited depending on conditions of a relevant frequency band according to regulations that must be observed when using the relevant frequency band.

In order for the relevant frequency band to be used in this environment, there is a need for a procedure of checking the relevant frequency band in order to protect a user having priority for the relevant frequency band or to satisfy administrative/policy regulations. A Dynamic Frequency Selection (DFS) method of adaptively adjusting the bandwidth of a channel or switching a channel may be used depending on the result of the check. In a method of checking the state of a channel (i.e., a precondition for the DFS procedure), an efficient method of minimizing the consumption of radio resources that may occur when a channel having a wide bandwidth is a target needs to be taken into consideration.

SUMMARY OF THE INVENTION

An object of the present invention is to provide a method of transmitting management information, which supports a dynamic frequency selection (DFS) procedure in a WLAN system which supports an operating channel of a broadband.

Another object of the present invention is to provide a method of selectively quieting a specific subchannel in a WLAN system which supports an operating channel including a plurality of subchannels.

In an aspect, a method of dynamic frequency selection by an access point (AP) in a basic service set (BSS) in a wireless local area network is provided. The access point configured to communicate over a primary subchannel and a secondary subchannel. The method includes: transmitting a frame including a quiet element and a quiet channel element; and performing channel measurements in the quiet interval. The quiet element defines an quiet interval during which no transmission occurs, the quiet channel element indicates that the secondary subchannel is to be quieted during the quiet interval, and the quiet channel element indicates a condition under which the primary subchannel may be used during the quiet interval.

The first subchannel and the second subchannel may be non-contiguous subchannels.

The first subchannel and the second subchannel may each have a bandwidth of 80 MHz.

The quiet channel element may include an AP Quiet Mode field indicating whether a communication to the AP is allowed within the primary subchannel during the quiet interval.

The value of the AP quiet mode field may be set to 1 to indicate the communication to the AP is allowed within the primary subchannel during the quiet interval, and the value of the AP quiet mode field may be set to 0 to indicate the communication to the AP is not allowed within the primary subchannel during the quiet interval.

The step of performing channel measurements may include detecting a presence of a radar in the secondary channel.

The method may further include: selecting and advertising a new channel to the BSS for channel migration if the presence of the radar is detected in the secondary channel.

When the quiet channel element includes an AP quiet field being set to 1 to indicate a communication to the AP is allowed within the primary subchannel during the quiet interval, the quiet channel element may further includes one of a quiet count field, a quiet period field, a quiet duration field and a quiet offset field.

In another aspect, an access point in a basic service set (BSS) in a wireless local area network is provided. The access point configured to perform dynamic frequency selection in one of a primary subchannel and a secondary subchannel. The AP includes: a transceiver; and a controller operatively connected to the transceiver. The controller is configured to: transmit a frame including a quiet element and a quiet channel element and perform channel measurements in the quiet interval. The quiet element defines an quiet interval during which no transmission occurs, the quiet channel element indicates that the secondary subchannel is to be quieted during the quiet interval, and the quiet channel element indicates a condition under which the primary subchannel may be used during the quiet interval

BRIEF DESCRIPTION OF THE DRAWINGS

FIG. 6 is a block diagram showing an example of a quiet Information Element (IE) format.

FIG. 9 is a block diagram showing an example of a format of the quiet channel IE according to an embodiment of the present invention.

FIGS. 10 and 11 show other examples of formats of the quiet channel IEs according to embodiments of the present invention.

FIGS. 12 and 13 show other examples of formats of the quiet channel IEs according to embodiments of the present invention.

FIG. 14 is a block diagram showing a format of the VHT operating mode field.

FIG. 15 is a block diagram showing a format of the VHT operating mode field modified according to an embodiment of the present invention.

DESCRIPTION OF EXEMPLARY EMBODIMENTS

A management procedure in a wireless communication system and an apparatus for supporting the same according to embodiments of the present invention are described in detail with reference to the accompanying drawings. In the following embodiments, a Wireless Local Area Network (WLAN) system, from among wireless communication systems, is described as an example, but this is only illustrative. Accordingly, the embodiments of the present invention may also be likewise applied to other wireless communication systems in addition to the WLAN system except that other wireless communication systems are not allowed in terms of their properties. In this case, terms or words unique to the WLAN system used in the embodiments of the present invention may be properly changed into other terms or words which are officially used in a relevant wireless communication system.

Figure 1:
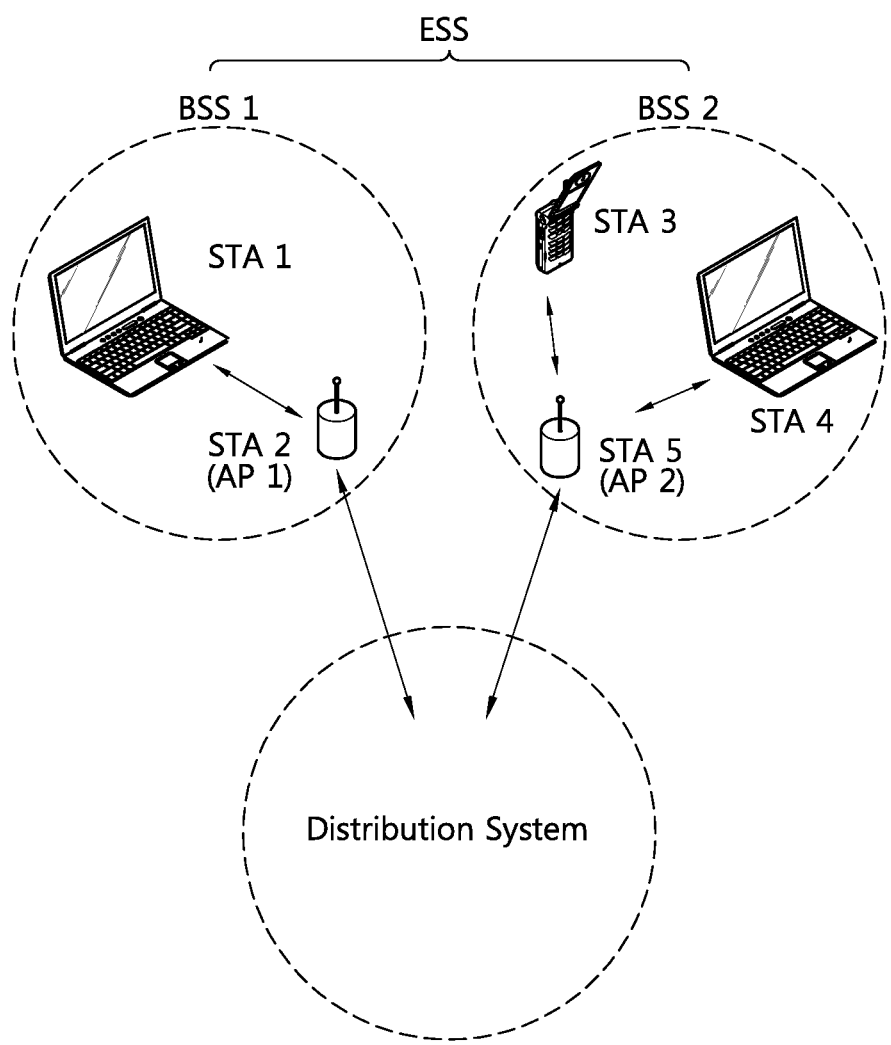
FIGS. 1 and 2 schematically show examples of the configurations of a WLAN system to which an embodiment of the present invention may be applied.
Figure 2:
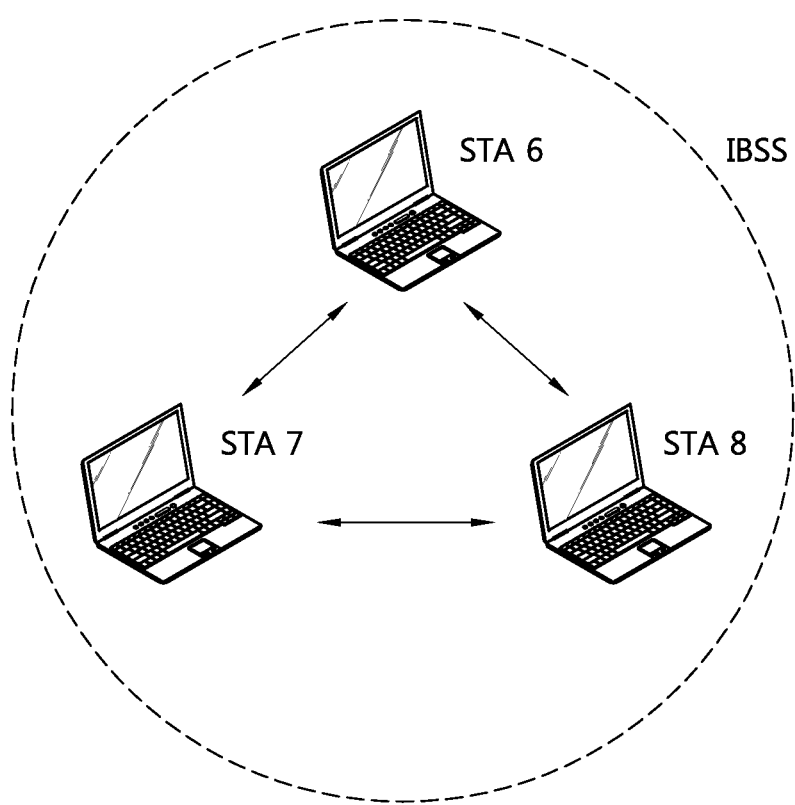

FIGS. 1 and 2 schematically show examples of the configurations of a WLAN system to which an embodiment of the present invention may be applied.

Referring to FIGS. 1 and 2, the WLAN system includes one or more Basic Service Sets (BSSs). The BSS is a set of stations (STAs) that are successfully synchronized with one another for communication, but is not a concept indicating a specific area. The BSS may be classified into an infrastructure BSS, an independent BSS (IBSS), and a Mesh BSS (MBSS). The infrastructure BSS is shown in FIG. 1, and the IBSS is shown in FIG. 2. The infrastructure BSSs BSS1 and BSS2 include one or more STAs STA1, STA3, and STA4, an Access Point (AP) (i.e., an STA providing distribution service), and a Distribution System (DS) coupling a plurality of APs AP1 and AP2. Meanwhile, in the IBSS, all STAs consist of mobile STAs STA6, STA7, and STA8 because an AP is not included. Furthermore, all the STAs form a self-contained network because access to a DS is not permitted. The MBSS is a network consisting of Mesh Points (MPs) and is another example of the self-contained network.

An STA is a functional entity, including Medium Access Control (MAC) according to the regulations of IEEE 802.11 and a physical layer interface for a Wireless Medium (WM). In a broad sense, an STA includes both an AP and a non-AP STA. An STA for wireless communication includes a processor and a transceiver and may further include a user interface, display means, etc. The processor is a functional unit configured to generate a frame to be transmitted over a wireless network or to process a frame received over the wireless network. The processor performs several functions for controlling an STA. Furthermore, the transceiver is functionally coupled to the processor and configured to transmit and receive frames over a wireless network for an STA.

Mobile terminals manipulated by users, from among STAs, include non-AP STAs STA1, STA3, STA4, STA6, STA7, and STA8. When a mobile terminal is simply called an STA, it also refers to a non-AP STA. A non-AP STA may also be called another terminology, such as a Wireless Transmit/Receive Unit (WTRU), User Equipment (UE), a Mobile Station (MS), a Mobile Terminal (MT), or a Mobile Subscriber Unit (MSU).

Furthermore, the AP AP1 or AP2 is a functional entity for providing access to the DS via a WM for STAs associated therewith. In an infrastructure BSS including an AP, communication between non-AP STAs is basically performed via the AP. If a direct link has been set up between non-AP STAs, however, the non-AP STAs may directly communicate with one another. The AP may also be called another terminology, such as a centralized controller, a Base Station (BS), a node-B, a Base Transceiver System (BTS), or a site controller.

A plurality of infrastructure BSSs may be interconnected through a Distribution System (DS). The plurality of BSSs coupled through the DS is called an Extended Service Set (ESS). STAs included in the ESS may communicate with one another. A non-AP STA may move from one BSS to the other BSS while performing seamless communication within the same ESS.

The DS is a mechanism for enabling one AP to communicate with the other AP. According to this mechanism, an AP may transmit a frame for STAs associated with a BSS managed by the AP, transfer a frame if one STA has moved to another BSS, or transfer a frame to an external network, such as a wired network. The DS does not need to be necessarily a network, and it may have any form if the DS can provide specific distribution service defined in IEEE 802.11. For example, the DS may be a wireless network, such as a mesh network, or a physical structure for coupling APs.

Figure 3:
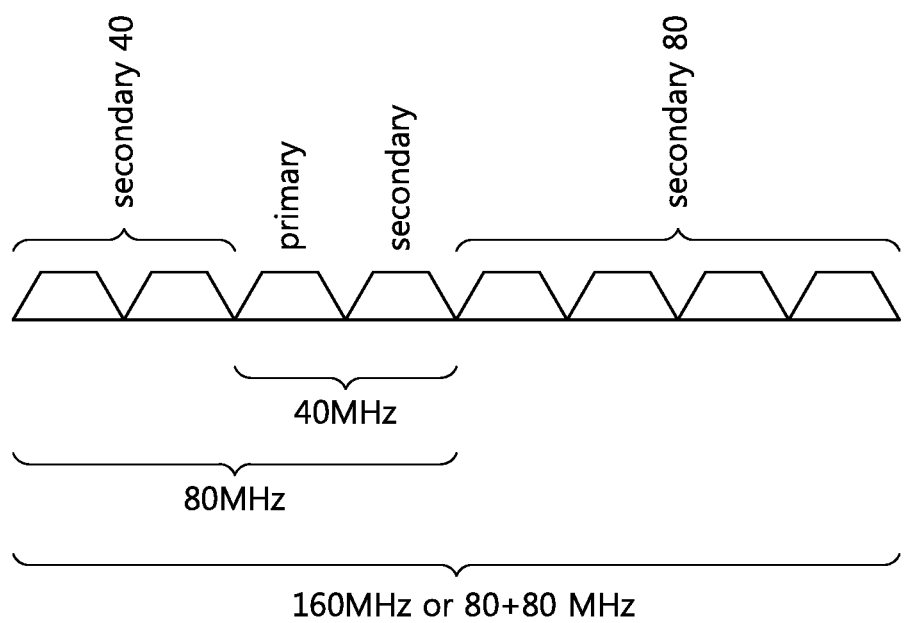
FIG. 3 illustrates channels that may be configured as operating channels in the Basic Service Set (BSS) of a WLAN system, together with bandwidths thereof.

FIG. 3 illustrates channels that may be configured as operating channels in the Basic Service Set (BSS) of a WLAN system, together with bandwidths thereof.

The operating channel of the BSS refers to a channel used to transmit a frame transmitted in order for an AP to provide control information and/or management information to stations (STAs) associated therewith. A beacon frame is an example of a frame that is transmitted by an AP in order to provide control information and/or management information. In an IBSS, an operating channel may refer to a channel on which a Dynamic Frequency Selection (DFS) owner transmits a beacon frame. The DFS owner refers to an STA that is responsible for selecting a target channel to which switching will be made if an operating channel needs to be changed in an IBSS.

In the example of FIG. 3, a basic unit of the channel width is configured to be 20 MHz. An example in which the basic unit of the channel width is 20 MHz is hereinafter described, but this is only illustrative. The basic unit of a channel width is not limited to 20 MHz and may be configured in various ways by taking a frequency situation of an available band into consideration. A VHT WLAN system may support an operating channel having a wide band. A VHT BSS is the BSS of a VHT WLAN system. In the VHT BSS, a beacon frame including a VHT operating element is broadcasted. The VHT operating element includes information for supporting an operating channel having a wide bandwidth. More specifically, the VHT operating element may include channel band information and channel center frequency information. If a plurality of non-contiguous frequency bands is used as operating channels, information to indicate the center frequency may be included in each of non-contiguous frequency segments.

FIG. 3 shows an example in which operating channels having channel widths of 20 MHz, 40 MHz, 80 MHz, 160 MHz, and 80 MHz+80 MHz may be configured. In this example, the operating channel 80 MHz+80 MHz refers to an operating channel composed of two non-contiguous 80 MHz channels.

A primary channel is a common channel for all STAs that are members of a BSS. A secondary channel is a channel associated with the primary channel and may be used to extend the bandwidth of an operating channel.

A primary 40 MHz channel refers to a subchannel used to transmit 40 MHz Physical Layer Convergence Procedure (PLCP) Protocol Data Units (PPDUs) in an 80 MHz, 160 MHz, or 80 MHz+80 MHz VHT BSS. The primary 80 MHz channel refers to a subchannel used to transmit 80 MHz PPDUs in a 160 MHz or 80 MHz+80 MHz VHT BSS. Here, an 'n' MHz PPDU refers to a PPDU in which the transmission vector parameter (TXVECTOR parameter) CH_BANDWIDTH of a relevant PPDU is configured as a CBW 'n'.

A secondary 40 MHz channel is a subchannel contiguous to a primary 40 MHz channel contiguous in the 80 MHz VHT BSS. The secondary 40 MHz channel, together with the primary 40 MHz channel, forms an 80 MHz channel. In the 160 or 80+80 MHz VHT BSS, a secondary 40 MHz channel, together with a primary 40 MHz channel, forms a primary 80 MHz channel.

A secondary 80 MHz channel is an 80 MHz subchannel not including a primary 20 MHz channel in the 160 or 80+80 MHz VHT BSS. The secondary 80 MHz channel, together with a primary 80 MHz channel, forms the 160 MHz or 80+80 MHz channel.

In the 40, 80, 160, or 80+80 MHz VHT BSS, a channel not including the primary 20 MHz channel is called a non-primary channel.

Figure 4:
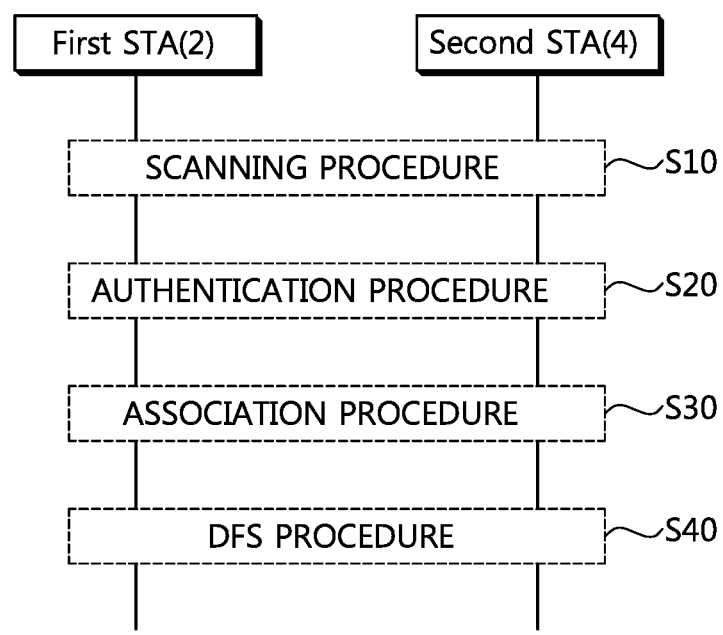
FIG. 4 shows an operating procedure illustrating the management procedure of a wireless network according to an embodiment of the present invention in a WLAN system.

FIG. 4 shows an operating procedure illustrating the management procedure of a wireless network according to an embodiment of the present invention in a WLAN system, such as that shown in FIG. 1 or 2, or a wireless communication system that is substantially the same as or equal to the WLAN system. The operating procedure between a first STA(2) and a second STA(4) shown in FIG. 4 may be a procedure performed between a non-AP STA and an AP that form an infrastructure BSS, but it is evident that the present embodiment is not limited thereto. For example, the present embodiment may also be applied to an operation between non-AP STAs forming an IBSS, an operation between MPs forming a mesh network system, or an operation between UEs or between UE and a BS that form another wireless communication system likewise or equivalently except a wireless communication system to which the present embodiment may not be substantially applied.

Referring to FIG. 4, the radio measurement procedure in a wireless communication system according to the embodiment of the present invention includes a scanning procedure S10, an authentication procedure S20 and/or an association procedure S30 (i.e., preliminary procedures) and further includes a DFS procedure S40 performed after the preliminary procedures S10 to S30. In accordance with an aspect of the embodiment of the present invention, at least some of the preliminary procedures may be arbitrary procedures not essential procedures.

Referring to FIG. 4, the scanning procedure S10 is first performed between the first STA(1) and the second STA(4). The scanning procedure S10 is a process in which the first STA(2) searches for a candidate STA (i.e., the subject to be associated therewith in the association procedure S30). For example, in an infrastructure BSS, the scanning procedure may be called a process in which a non-AP STA searches for an AP. In a broad sense, however, it may be said that the scanning procedure S10 includes a process in which a non-AP STA searches for an neighbor non-AP STA in case of an IBSS or a process of searching for an neighbor MP in case of a mesh network.

The scanning procedure includes two types. The first type is a passive scan method and is a method using a beacon frame transmitted by the second STA(4), etc. In this method, the first STA(2) trying to access a WLAN may search for an accessible BSS (or IBSS) by receiving a beacon frame that is periodically transmitted by the second STA(4) (i.e., an AP that manages the BSS).

The second type of the scanning procedure is an active scan method. According to the active scan method, the first STA(2) trying to access a WLAN system first sends a probe request frame. The second STA(4) (e.g., an AP) that has received the probe request frame sends a probe response frame, including a Service Set ID (SSID) of a BSS managed by the second STA(4) and information, such as capabilities supported by the second STA(4), to the first STA(2). Accordingly, the first STA(2) may know various pieces of information about candidate APs along with the existence of the candidate APs based on the received probe response frame.

In the scanning procedure S10, the second STA(4) that sends the beacon frame or the probe response frame may send information that may be used in a Dynamic Frequency Selection (DFS) procedure through the beacon frame or the probe response frame. As an example of information that may be used in the DFS procedure, a quiet element and/or a quiet channel element may be included in the beacon frame or the probe response frame. Information utilized in the DFS procedure that may be included in the beacon frame or the probe response frame will be described in detail later.

Referring to back FIG. 4, the authentication procedure S20 is performed between the first STA(2) and the second STA(4). The authentication procedure S20 is a process in which entities participating in wireless communication negotiate an authentication procedure, an encryption method, etc. For example, the first STA(2) may perform the authentication procedure S20 along with a second STA (e.g., an AP) to be associated therewith, from among one or more APs retrieved in the scanning procedure S10. In most cases, an open system authentication method is used in a WLAN. The second STA(4) (i.e., an AP) performs an authentication process without any condition on the authentication request from the first STA(2). More enhanced authentication methods may include Extensible Authentication Protocol-Transport Layer Security (EAP-TLS), Extensible Authentication Protocol-Tunneled Transport Layer Security (EAP-TTLS), Extensible Authentication Protocol-Flexible Authentication via Secure Tunneling (EAP-FAST), and a Protected Extensible Authentication Protocol (PEAP) which are based on IEEE 802.1x.

After authentication is successfully completed in the authentication procedure S20, the first STA(2) performs the association procedure S30. In this step, the association procedure S30 may be a specific procedure performed when the first STA(2) is a non-AP STA and the second STA(4) is an AP. The association procedure S30 means setting up a connection (i.e., a radio link) that may be identified between the first STA(2) and the second STA(4). For the association procedure S30, the first STA(2) first sends an association request frame to the second STA(4) that has successfully completed the authentication procedure S20. In response thereto, the second STA(4) sends an association response frame, having a state value 'successful)', to the first STA(2). The association response frame includes an identifier (ID) (e.g., an association ID (AID)) on which association with the first STA(2) may be identified.

If the connection between the first STA(2) and the second STA(4) (i.e., an AP) becomes poor due to a variable channel situation after the association procedure S30 has been successfully completed, the first STA(2) may perform an association procedure along with another accessible AP again. This is called a re-association procedure. The re-association procedure is very similar to the association procedure S30. More specifically, in the re-association procedure, the first STA(2) sends a re-association request frame to another AP (i.e., an AP that has successfully completed the authentication procedure S20, from among candidate APs retrieved in the scanning procedure S10) not an AP that is now associated therewith. In response to re-association request frame, another AP sends a re-association response frame to the first STA(2). In this case, the re-association request frame further includes information about the AP that was previously associated. Thus, the re-associated AP may transfer data buffered in the second STA(4) (i.e., the existing AP), to the first STA(2) based on the information.

In the association and re-association procedures, the first STA(2) may provide the second STA(4) with a list of channels in which the first STA(2) may be operated. The list of channels may be included in the association request frame or the re-association request frame and then transmitted.

After the authentication procedure S20 is completed or the association procedure S30 is completed in addition to the authentication procedure S20, the DFS procedure S40 may be performed between the first STA(2) and the second STA(4). In FIG. 4, although a location procedure is illustrated as being performed between the first STA(2) and the second STA(4) that have completed the association procedure S30 in an infrastructure BSS, the DFS procedure S40 to be described according to an embodiment of the present invention is not limited to the location procedure. That is, the DFS procedure according to the embodiment of the present invention may be applied to two STAs that have set up a radio link therebetween, irrespective of whether the two STAs are non-AP STAs, APs, or MPs. For example, the DFS procedure according to the embodiment of the present invention may also be performed between not only a non-AP STA and an AP forming an infrastructure BSS, such as that shown in FIG. 3, but also non-AP STAs forming an IBSS and an MBSS.

In a WLAN, the DFS procedure enables an operating channel to be adaptively switched according to a change of a channel environment. An AP and an STA may maintain or change an operating channel through the DFS procedure. Whether an operating channel will be changed may be determined by an AP based on a current condition of the operating channel. For example, if a current condition of an operating channel is deteriorated, an operation channel is subject to interference from a homogeneous or heterogeneous communication system, or the use of a relevant channel is no longer permitted in a specific condition according to policy and administrative regulations, an AP may determine to stop using the operating channel and to configure a new operating channel.

A WLAN operating in a 5 GHz band is hereinafter assumed. A reason that a channel must be switched through the DFS procedure is assumed to be regulations for protecting a radar signal using the 5 GHz band. This is only for convenience of description, and it should not be construed as being a limit to a frequency band to which the present invention is applied, a target signal detected in the DFS procedure, and so on. Furthermore, in the following embodiments, a limit to the transmission and reception of a frame in a specific channel may be performed irrespective of the DFS procedure.

The DFS procedure may include the association procedure S30 of FIG. 4 between an AP and STAs. The DFS procedure may include quieting a current channel, measuring a new channel, stopping an operation when a radar signal is detected as a result of the measurement, selecting the new channel, and informing STAs of the new channel.

Figure 5:
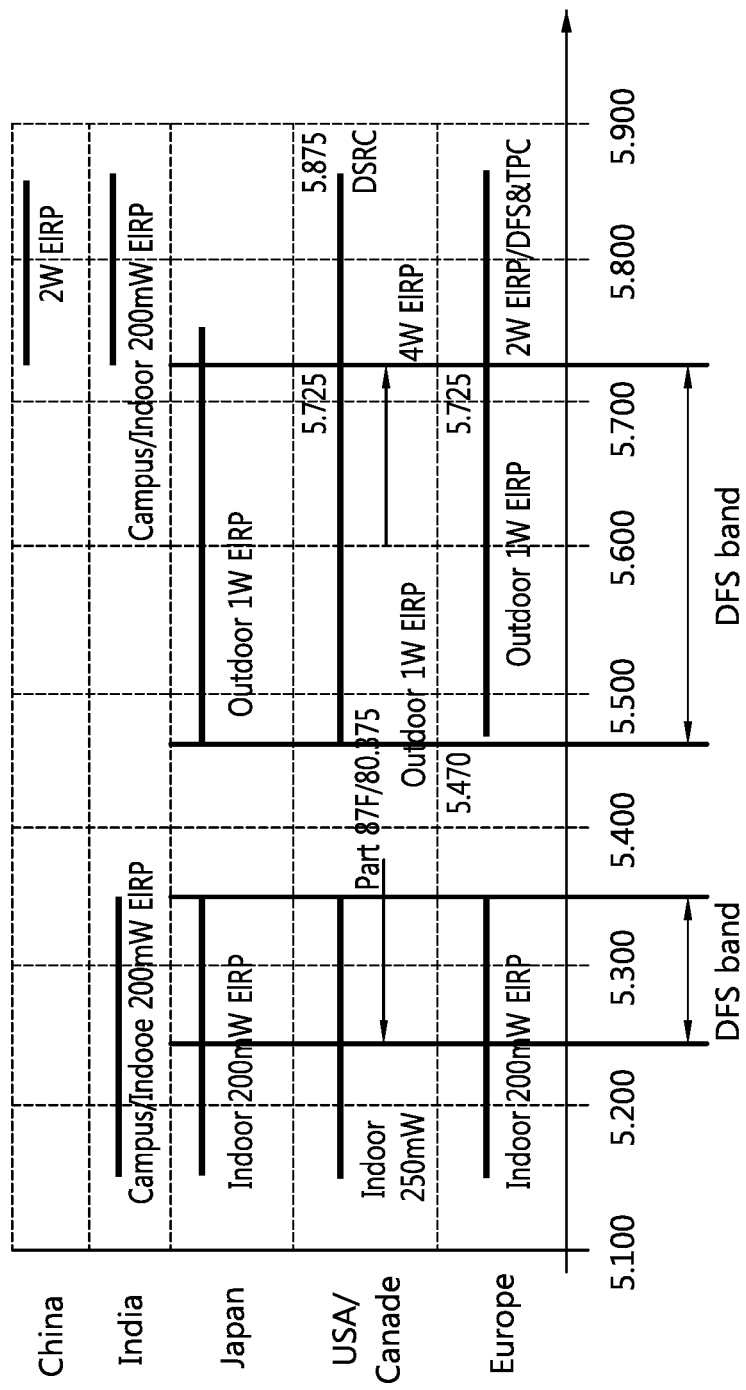
FIG. 5 shows spectrum details of a 5 GHz band that may become an operating bandwidth of a VHT WLAN system.

FIG. 5 shows spectrum details of a 5 GHz band that may become an operating bandwidth of a VHT WLAN system. In FIG. 5, bands (i.e., 5.25 GHz to 5.35 GHz and 5.47 GHz to 5.725 GHz) indicated by DFS bands may have a radar signal. Thus, if the radar signal is detected in the bands through a DFS procedure, the operating channels of the bands must be switched to the operating channels of other bands.

When any BSS of a WLAN uses a DFS band as the band of an operating channel (i.e., an operating band), the AP and non-AP STAs of the BSS have to frequently detect the existence of a radar signal before or while the band is used. Prior to a test for detecting the existence of a radar signal in the band, the AP prohibits all the STAs within the BSS from transmitting frames through a current operating channel. That is, the AP may transmit a quiet Information Element (IE) for quieting all the STAs. The quiet IE may be included in a beacon frame and then broadcasted to all the STAs within the BSS or may be included in a probe response frame and then transmitted to individual STAs.

Each of the STAs that have received the quiet IE from the AP has a quiet duration for which the transmission/reception of a frame is prohibited according to a value configured in the quiet IE. The AP may detect the existence of a radar signal without experiencing interference according to the transmission/reception of frames of other STAs in the band.

If a radar signal is detected in the band, the AP may move the existing operating band to another frequency band. In FIG. 5, an EIRP is an abbreviation of an Effective Isotropic Radiated Power, and DSRC 5.9 GHz refers to a frequency band dedicated to short-range communication. Dynamic Frequency Selection (DFS) is a scheme for detecting a radar signal in a 5 GHz frequency band and for using a uniform channel and is also a scheme for automatically allocating the frequency. Furthermore, DFS is a power control scheme proposed in 802.11h so that transmission power is properly controlled in order to reduce interference, control the arrival distance, and reduce power consumption in a Transmit Power Control (TPC) 5 GHz frequency band.

FIG. 6 is a block diagram showing an example of a quiet Information Element (IE) format.

The quiet IE may include an element ID field, a length field, a quiet count field, a quiet period field, a quiet duration field, and a quiet offset field.

The element ID field is set to a value indicating ID information about an element, and it indicates that the present element is a quiet IE.

The length field may be set to a value indicating the length of the quiet count field, the quiet period field, the quiet duration field, and the quiet offset field. For example, the length field may be set to 6 octets, so that it indicates that the quiet count field (1 octet), the quiet period field (1 octet), the quiet duration field (2 octets), and the quiet offset field (2 octets) follow.

The quiet count field is set to the number of Target Beacon Transmission Times (TBTTs) until a beacon interval during which a next quiet interval starts. A value of 1 indicates the quiet interval starts during the beacon interval starting at the next TBTT. A value of 0 is reserved.

The quiet period field is set to the number of beacon intervals between the start of regularly scheduled quiet intervals defined by this quiet IE. A value of 0 indicates that no periodic quiet interval is defined.

The quiet duration field is set to the duration of the quiet interval and is expressed in TUs.

The quiet Offset field is set to an offset of the start of the quiet interval from a TBTT specified by the quiet count field and is expressed in TUs. The value of the quiet Offset field is less than one beacon interval.

When an AP transmits the quiet IE to an STA, the AP and the STA may be operated as follows.

An AP in a BSS may schedule quiet intervals by transmitting one or more quiet IEs in beacon frames and probe response frames. The AP may stop scheduling quiet intervals or change the value of the quiet period field, the quiet duration field, and the quiet offset field in quiet IEs as required. Only the most recently received beacon frame or probe response frame defines all future quiet intervals; therefore, quiet intervals based on older beacon frames or probe response frames shall be discarded.

Only an STA that is the DFS owner in an IBSS may specify a schedule of quiet intervals, by transmitting one or more quiet IEs in the first beacon frame establishing the IBSS. All the STAs in an the IBSS shall continue these quiet interval schedules by including appropriate quiet IEs in any transmitted Beacon frames or probe response frames.

Multiple independent quiet intervals may be scheduled, to ensure that not all quiet intervals have the same timing relationship to a TBTT, by including multiple quiet IEs in Beacon frames or Probe Response frames.

Control of the channel is lost at the start of a quiet interval, and the NAV is set by all the STAs in the BSS for the length of the quiet interval. Transmission by any STA in the BSS of any MPDU and any associated acknowledgment within either the primary channel or secondary channel (if present) of the BSS shall be complete before the start of the quiet interval. If, before starting transmission of an MPDU, there is no enough time remained to allow the transmission to complete before the quiet interval starts, the STA shall defer the transmission by selecting a random backoff time, using the present CW (without advancing to the next value in the series). The short retry counter and long retry counter for the MSDU or A-MSDU are not affected.

For testing channels for radars, an STA does not perform transmission in a channel unless it has been tested for the presence of radars according to regulatory requirements.

If radar signals are detected, an attempt may be made to move a BSS to a new operating channel.

The above-described quiet IE was used to measure a channel without interference due to other STAs within a BSS. The above quiet IE quiets all the subchannels of an operating channel. However, the operating channel may include a plurality of subchannels. Some of the subchannels may exist in bands other than a DFS band. If even the subchannels existing other than the DFS band are quieted in order to check whether radar signals exist in a channel within the DFS band, the efficient utilization of radio resources is reduced. This problem may frequently occur in a VHT WLAN system supporting a channel width having a wide band.

Figure 7:
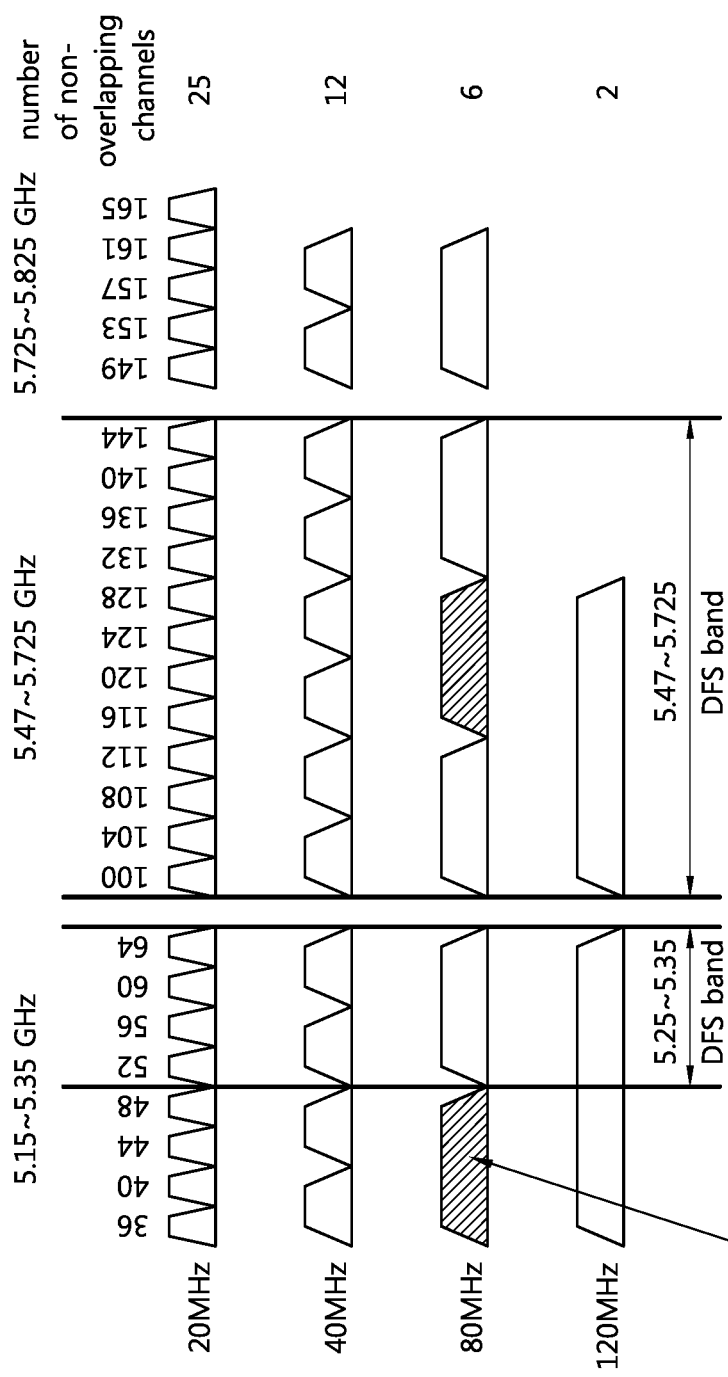
FIG. 7 illustrates the above problem that may occur in a VHT WLAN system supporting an operating channel having a wide band.

FIG. 7 illustrates the above problem that may occur in a VHT WLAN system supporting an operating channel having a wide band.

In the example of FIG. 7, the WLAN system has operating channels including a first channel having an 80 MHz bandwidth and a second channel having an 80 MHz bandwidth. The second channel exists in a DFS band, and the first channel is a channel outside the DFS band. In this situation, if both the first and the second channels are quieted in order to check whether radar signals exist in the band of the second channel existing in the DFS band, both the first and the second channels cannot be used during the quiet Interval. However, to quiet the first channel (i.e., a channel outside the DFS band) causes the waste of radio resources. The present invention proposes a method of solving the problem.

Figure 8:
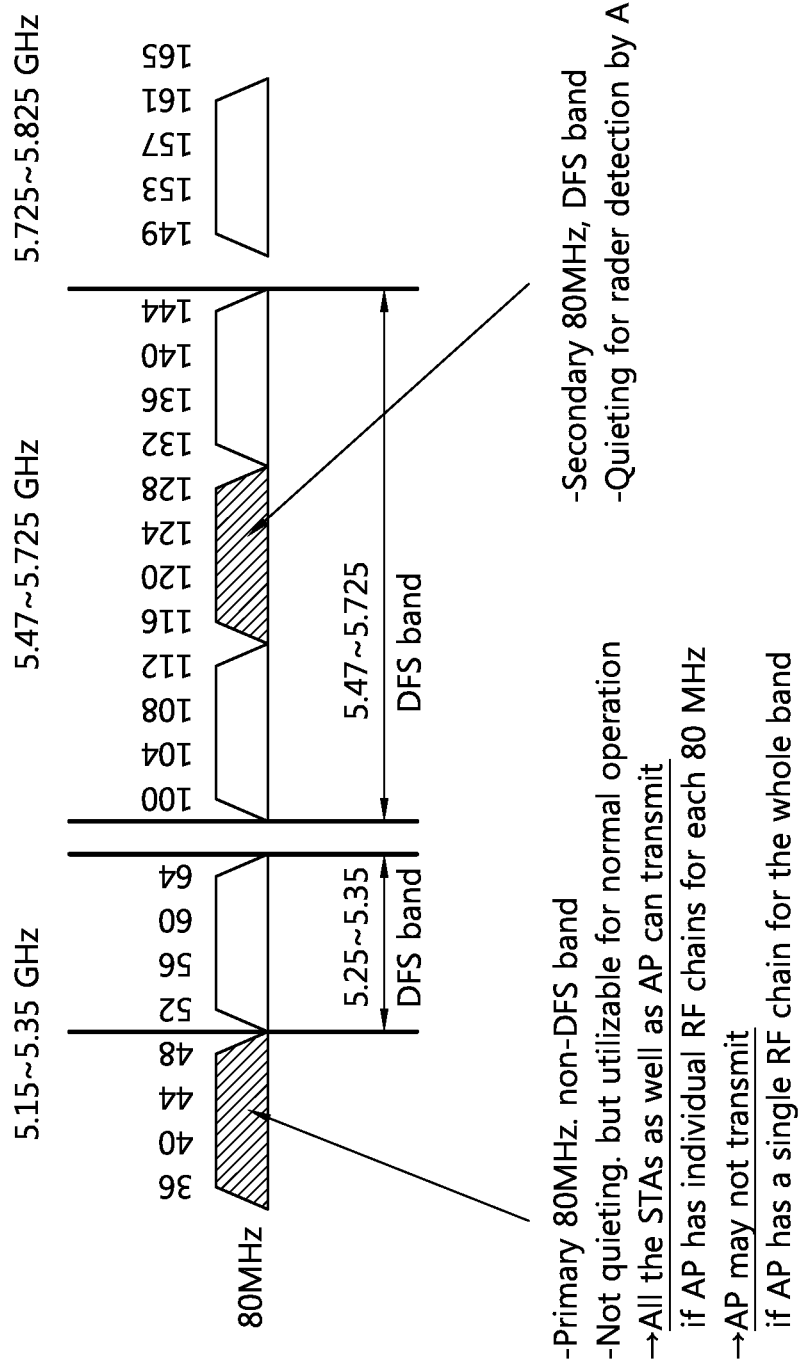
FIG. 8 shows a method of utilizing channels according to an embodiment of the present invention.

FIG. 8 shows a method of utilizing channels according to an embodiment of the present invention.

It is assumed that WLAN system has operating channels including a first channel having an 80 MHz bandwidth and a second channel having an 80 MHz bandwidth, respectively, as in the example of FIG. 7. The first channel is a primary channel and is placed outside the DFS band, and the second channel is a secondary channel and is placed within the DFS band. In accordance with an embodiment of the present invention, when the second channel is quieted, the first channel may not be quieted according to circumstances. In other words, all the channels are not quieted as in the prior art, but an STA may be informed of whether a relevant channel will be quieted according to each frequency band or each subchannel.

In the example of FIG. 8, the second channel may be quieted, and the first channel may not be quieted. In this case, a frame can be transmitted and received through the first channel during the quiet interval of the second channel That is, frames can be transmitted and received through channels through which the transmission/reception of the frames are not prohibited although the transmission/reception of frames using some channels forming operating channels are prohibited, thereby being capable of improving the utilization of radio resources.

In other words, whether each of subchannels forming an operating channel has been prohibited for a specific duration is determined, and an STA is informed of the result of the determination, so that the STA can know whether each of the subchannels is available according to the conditions of the subchannels.

If the use of the second channel is prohibited, but the use of the first channel is permitted, an STA may use the first channel If an AP has an RF chain for each of the first and the second channels, the AP can perform normal communication using the first channel for a relevant quiet interval like STAs. In accordance with an embodiment of the present invention, in order to inform whether the use of each of subchannels has been prohibited, pieces of additional information may be transmitted in addition to the pieces of information defined in the quiet IE of FIG. 6. In the embodiment of the present invention, the pieces of additional information provided to an STA may be transmitted along with or independently from the quiet IE of FIG. 6 and may be transmitted as a separate IE. The quiet channel element may be transmitted through a management/control frame or may be included in a beacon frame or probe response frame and then transmitted.

An example in which the pieces of additional information are transmitted to an STA as an Information Element (IE) separate from the quiet IE of FIG. 6 is described below. The IE provided according to the embodiment of the present invention is hereinafter referred to as a quiet channel IE in order to distinguish the quiet channel IE from the quiet IE of FIG. 6. The name of the 'quiet channel IE' and the name of a field in which pieces of information included in the quiet channel IE are set are only illustrative. The pieces of information included in the quiet channel IE may be omitted or other pieces of information may be added to the quiet channel IE according to circumstances.

FIG. 9 is a block diagram showing an example of a format of the quiet channel IE according to an embodiment of the present invention.

The quiet channel IE may include an element ID field, a length field Length, an AP status flag field, a quiet operating class field, and a quiet channel number field.

The element ID field may be set to a value indicating that the present ID is a quiet channel IE. The length field may indicate the length of a field added posterior to the length field.

The AP status flag field provides information about an AP operation in operating channels whose use are not prohibited by a quiet channel IE when the use of only some of operating channels are prohibited by the quiet channel IE. That is, in the example of FIG. 8, if only the second channel is quieted through the quiet channel IE, the AP status flag field may indicate an AP operation in the first channel. The AP status flag field may indicate whether the AP can transmit and receive frames to and from STAs in the first channel. For example, if the AP status flag field has 1 bit size and the field value is set to '1', the AP status flag field may indicate that the AP may transmit and receive frames to and from an STA in the first channel. If the field value is set to '0', the AP status flag field may indicate that the AP may not transmit and receive frames to and from an STA using the first channel during a quiet interval. If the AP cannot transmit and receive frames to and from an STA through the first channel while testing radar signals in the second channel because the AP uses a single RF chain or the AP cannot use the first channel during the quiet interval or the use of the first channel is not preferred because of a channel condition or an administrative regulation, the AP status flag field may be set to 0 in order to inform the AP that the transmission/reception of a frame are impossible in the first channel The quiet operating class field may be set to a value indicating the operating class of a specific area/nation. The quiet channel number field subsequent to the quiet operating class field may be set to a value indicating a specific channel within a set of channels of the quiet operating class. That is, the quiet channel number field may inform an operating class value defined according to a nation, and the quiet channel number field may inform the number of a channel to be quieted. For example, in the example of FIG. 8, if the second channel is sought to be quieted, the quiet operating class field may be set to a value indicating a specific nation, and the quiet channel number field may be set to a channel number 116. A pair of the quiet operating class field and the quiet channel number field may be indicated by a target channel that will quiet one 20 MHz channel. Accordingly, in order to quiet the second channel in the example of FIG. 8, pairs of four quiet operating class fields and four quiet channel number fields may be needed. Here, the four quiet channel number fields may be set to values indicating a channel number 116, a channel number 120, a channel number 124, and a channel number 128, respectively.

An STA receives the quiet channel IE from the AP, knows that a target channel whose use is prohibited during a quiet interval based on the quiet channel IE, and does not transmit and receive frames in the target channel (i.e., the second channel in this example) during the quiet interval. Here, the STA that has received the quiet channel IE may configure an NAV during the quiet interval.

During the quiet interval, the AP checks the existence of radar signals in the second channel and can transmit and receive frames to and from the STA according to the setting of the AP status flag field in the first channel.

FIGS. 10 and 11 show other examples of formats of the quiet channel IEs according to embodiments of the present invention.

The quiet channel IE includes an element ID field, a length field a BSS usable channel width field, an AP quiet mode field, a quiet count field, a quiet period field, a quiet duration field, and a quiet offset field.

The settings of the element ID field and the length field and what indicated by the element ID field and the length field are the same as those described with reference to the FIG. 9.

The BSS usable channel width field indicates the only allowed channel band in use by STAs within a BSS during intervals indicated by the quiet channel IE. For example, the field value of the BSS usable channel width field is set to 0 for a primary 80 MHz bandwidth. For another example, the field value of the BSS usable channel width field is set to 0 for a primary 20 MHz band, 1 for a primary 40 MHz bandwidth, or 2 for a primary 80 MHz bandwidth.

The AP quiet mode field specifies an STA behavior during the quiet interval. Communications with an AP are allowed on a channel indicated by the BSS usable channel width field, and the AP quiet mode field is set to 1. Otherwise, it is set to 0.

The quiet count field is set to the number of TBTTs until a beacon interval during which a next quiet interval starts. A value of 1 indicates that the quiet interval starts during the beacon interval starting at a next TBTT. A value of 0 is reserved.

The quiet period field is set to the number of beacon intervals between the start of regularly scheduled quiet intervals defined by this quiet channel IE. A value of 0 indicates that no periodic quiet interval is defined.

The quiet duration field is set to the duration of the quiet interval and is expressed in TUs.

The quiet offset field is set to an offset of the start of the quiet interval from a TBTT specified by the quiet count field and is expressed in TUs. The value of the quiet Offset field is less than one beacon interval.

If the quiet channel IE shown in FIG. 10 is solely included in an indication frame (e.g., a beacon frame or a probe response frame) and transmitted, only enhanced devices, such as VHT STAs capable of interpreting the quiet channel IE, can be quieted in a DFS band other than non-DFS bands specified by the BSS usable channel width field. If the quiet channel IE is independently included in the indication frame and transmitted without the quiet IE, legacy devices, such as non-VHT STAs unable to recognize the quiet channel IE (or not supporting), do not perform operations related to quiet because they do not interpret the quiet channel IE and also do not receive the quiet channel IE.

On the other hand, enhanced devices, such as VHT STAs, can receive and interpret the quiet channel IE of FIG. 10. Thus, the enhanced devices are quieted only in the DFS band other than the non-DFS bands specified by the BSS usable channel width during a relevant quiet interval, but they can perform normal communication in the non-DFS bands specified by the BSS usable channel width. Here, whether communication between the AP and the STA is allowed in the non-DFS bands may be additionally specified according to the value of the AP quiet mode field. A VHT STA is hereinafter described as an example of an STA capable of recognizing the quiet channel IE, but this is for convenience of description. It should be understood that the VHT STA is a representative STA supporting a selective channel quiet method using the quiet channel IE.

In accordance with an embodiment of the present invention, a quiet channel IE, such as that shown in FIG. 10, may be transmitted irrespective of whether the quiet IE has been transmitted. In this case, there is an advantage in that, when the quiet channel IE is independently transmitted, non-VHT STAs operating in non-DFS bands may continue to perform normal communication during quiet intervals.

If the quiet channel IE is always transmitted along with the quiet IE of FIG. 6, STAs unable to recognize the quiet channel IE recognize only the quiet IE and thus cannot transmit and receive frames even in the non-DFS bands during quiet intervals. Meanwhile, since the quiet channel IE of FIG. 10 according to the present invention replaces the quiet IE and it is included in the indication frame and transmitted, STAs unable to recognize the quiet channel IE may continue to operate irrespective of whether the quiet channel IE has been transmitted. On the other hand, VHT STAs capable of recognizing the quiet channel IE may determine whether to operate in a relevant channel according to the setting of each of the field values of the quiet channel IE.

FIG. 11 shows a format of a quiet channel IE, not including the quiet count field, the quiet period field, the quiet duration field, and the quiet offset field included in the quiet channel IE having the format of FIG. 10. The fields omitted in the quiet channel IE having the format of FIG. 11 are fields related to information related to the setting of a quiet interval. If the quiet channel IE is transmitted along with the quiet IE, the field including the information that may be redundant may be omitted because the quiet interval may be set by the quiet IE. If the AP quiet mode field is set to 0 (i.e., an AP is not allowed to transmit and receive frames to and from STAs in a subchannel specified by the BSS usable channel width field during the quiet interval), the setting of the quiet count field, the quiet period field, the quiet duration, and the quiet offset field is unnecessary. Accordingly, when the AP quiet mode field is set to 0, the format of FIG. 11 may be used, and when the AP quiet mode field is set to 1, the format of FIG. 10 may be used.

FIGS. 12 and 13 show other examples of formats of the quiet channel IEs according to embodiments of the present invention.

The quiet channel IE having the format of FIG. 12 includes an element ID field, a length field, and an AP quiet mode field. The element ID field includes IE ID information identifying that the present IE including the element ID field is a quiet channel IE. The length field includes length information of the quiet channel IE. For example, the sum of the lengths of fields included posterior to the length field may be set as the value of the length field.

The setting and function of the AP quiet mode field are the same as those described with reference to FIGS. 10 and 11. That is, the AP quiet mode field specifies the operation of an AP and the operations of STAs associated with the AP during quiet intervals. For example, the AP quiet mode field may be set to 1 if the AP is allowed to transmit and receive frames to and from STAs associated with the AP during quiet intervals. In other words, when the AP quiet mode field is set to 1, it means that some of subchannels forming an operating channel are not quieted during the quiet interval. Here, the AP and the STAs can communicate with each other (i.e., can transmit and receive frames) by using channels not quieted.

The quiet channel IE having the format of FIG. 12 does not include a field that indicates a subchannel not quieted (or a subchannel or channel bandwidth through which an AP and an STA can communicate with each other during a quiet interval). When the quiet channel IE having the format of FIG. 12 is used, a quiet interval not defined by the quiet channel IE having the format of FIG. 12 and a channel through which a frame can be transmitted and received between an AP and an STA according to the setting of the AP quiet mode during a quiet interval may be defined by another IE (e.g., the quiet IE) or may be defined as a preset value/channel agreed between an AP and an STA.

For example, when the 80 MHz secondary channel of a DFS band is quieted, it may be previously defined that an 80 MHz primary channel will be used as a channel through which frames can be exchanged between an AP and an STA according to the setting of the AP quiet mode field value. In this case, when the AP receives a quiet channel IE in which the AP quiet mode is set to 1, the AP can communication with STAs within the bandwidth of the primary 80 MHz channel during quiet intervals.

When the quiet channel IE having the format of FIG. 12 is used, a quiet interval may be defined by the quiet IE transmitted along with the quiet channel IE having the format of FIG. 12. That is, when the quiet IE of FIG. 6, together with the quiet channel IE having the format of FIG. 12, is transmitted to STAs through an indication frame (e.g., a beacon frame or a probe response frame), the STAs may be operated according to the quiet interval defined by the quiet count field, the quiet period field, and quiet duration field, and the quiet offset field defined in the quiet IE.

The quiet channel IE having the format of FIG. 13 further includes a quiet count field, a quiet period field, a quiet duration field, and a quiet offset field as compared with the quiet channel IE having the format of FIG. 12. That is, the quiet channel IE having the format of FIG. 13 includes information necessary to set a quiet interval. The quiet channel IE having the format of FIG. 13 may be transmitted independently from the quiet IE. In other words, an indication frame including only the quiet channel IE having the format of FIG. 13 can be transmitted without the quiet IE.

If the AP quiet mode field is set to 0, a quiet interval may not be defined in the quiet channel IE. This is because, if the AP quiet mode is set to 0, all the subchannels of an operating channel are quieted during quiet intervals. That is, since the same effect can be obtained if the quiet IE capable of being recognized by all STAs has only to be transmitted, the quiet channel IE may omit the transmission of fields related to quiet interval setting in addition to the AP quiet mode field. In other words, if the AP quiet mode field is set to 0, the quiet channel IE having the format of FIG. 12 may be used, and if the AP quiet mode field is set to 1, the quiet channel IE having the format of FIG. 13 may be used.

An AP may transmit the quiet channel IE having the format of FIG. 12 together with the quiet IE in order to provide information about a quiet interval. In other words, the quiet channel IE of FIG. 12 may be transmitted along with at least one quiet IE.

On the other hand, the quiet channel IE having the format of FIG. 13 may be transmitted along with the quiet IE, or only the quiet channel IE of FIG. 13 may be transmitted without the quiet IE.

In a WLAN system supporting an operating channel having a wide band, the selective quiet method for some bands of an operating channel or some of subchannels forming an operating channel has been proposed and the AP status flag field or the AP quiet mode field specifying the operations of an AP and STAs during quiet intervals has so far been described.

In some embodiments, the AP status flag field indicates whether communication with STAs during quiet intervals in non-quiet channels is possible and may also further set an indication bit indicating that an AP cannot transmit a frame, but can receive a frame owing to a self-interference problem. In this case, when the STAs try to transmit data to the AP, the STAs can transmit data by adopting a No-ACK policy in which ACK needs not to be received from the AP as an ACK policy.

The operations of an AP or non-AP STAs when the quiet channel IE of FIG. 12 or 13 is included in indication frames (e.g., beacon frames or probe response frames) are described below.

The AP may transit the quiet channel IE in order to quiet some bands or subchannels of an operating channel The quiet channel IE may be included in the indication frames and then transmitted. The beacon frame and the probe response frame are examples of the indication frames.

The AP may transmit the quiet channel IE together with the quiet IE. If the AP tries to quiet some bands or subchannels of a current operating channel, the AP may set the AP quiet mode field of the quiet channel IE to 1 and then transmit the quiet channel IE.

If the AP sets the AP quiet mode field to 1, the AP may transmit the quiet channel IE having the format of FIG. 12 or 13. If the AP sets the AP quiet mode field to 0, the AP may use the quiet channel IE having the format of FIG. 12. If the AP transmits the quiet channel IE having the format of FIG. 12, the AP transmits the quiet channel IE together with the quiet IE.

In the DFS procedure, if the quiet channel IE is transmitted, the AP checks whether radar signals exist in a quieted channel during quiet intervals. If, as a result of the check, radar signals exist, the AP may select a new operating channel and informs STAs of the new operating channel.

If the AP quiet mode field is set to 1, the AP may communicate with the STAs in non-quieted channels during quiet intervals.

STAs within a BSS may be divided into VHT STAs able to recognize the quiet channel IE and legacy STAs unable to recognize the quiet channel IE. The legacy STAs can interpret only the quiet IE do not transmit and receive frames in their operating channels during quiet intervals specified by the setting values of the quiet count field, the quiet period field, the quiet duration field, and the quiet offset field of the quiet IE and defer access to channels by setting NAVs.

The VHT STAs obtain their own operating information during quiet intervals from the AP quiet mode field of the quiet channel IE. If the AP quiet mode field is set to 0, information about the quiet interval is obtained through the quiet count field, the quiet period field, the quiet duration field, and the quiet offset field of the quiet IE transmitted together with the quiet channel IE. If the AP quiet mode field is set to 0, the VHT STAs set their NAVs during quiet intervals and defer access to channels.

If the AP quiet mode field is set to 1, when the quiet channel IE includes the quiet count field, the quiet period field, the quiet duration field, and the quiet offset field as in the format of FIG. 13, the VHT STAs obtain quiet intervals from the relevant fields and may set NAVs in a secondary 80

MHz channel during quiet intervals and exchange frames with the AP within a primary 80 MHz channel If the quiet channel IE does not include a field including information necessary to define a quiet interval as in the format of FIG. 12, the VHT STAs may obtain quiet interval information from the quiet IE transmitted together with the quiet channel IE.

An AP may transmit the quiet IE and/or the quiet channel IE in order to discard or update a quiet interval. An STA is operated based on a quiet interval obtained through the quiet IE or the quiet channel IE recently received and operating information during the quiet interval.

According to another embodiment of the present invention, a method of quieting a specific frequency band may include using a management frame. A VHT operating mode notification frame may be used as an example of the management frame.

The VHT operating mode notification frame is used to notify STAs that a sending STA is changing its operating channel width, the maximum number of spatial streams it can receive, or both. This frame can be sent by both a non-AP STA and an AP. If an AP wishes to change its operating mode, it broadcasts an action frame to all STAs in the BSS. The VHT operating mode notification frame may include pieces of information listed in Table 1.

TABLE 1

| Order | Information |
|---|---|
| 1 | Category |
| 2 | VHT Action |
| 3 | VHT Operating mode |

The category field is set to a value for a VHT. The VHT action field is set to a value for the VHT operating mode notification frame.

The VHT operating mode field is used in the VHT operating mode notification frame to indicate an operating channel width and an NSS on which a sending STA is able to receive. The length of the field may be 1 octet.

FIG. 14 is a block diagram showing a format of the VHT operating mode field.

The STA sending the VHT operating mode field indicates its current operating channel width and the number of spatial streams. The VHT operating mode field may include a channel width subfield, an Rx Nss subfield, and a Max Nss For SU Present subfield. Table 2 describes the setting and function of each of the subfields included in the VHT operating mode field.

TABLE 2

| Subfield | Description |
|---|---|
| Channel Width | If the Rx Nss Type subfield is 0, indicates the supported channel***width:*Set to 0 for 20 MHz*Set to 1 for 40 MHz *Set to 2 for 80 MHz*Set to 3 for 160 MHz or 80 + 80 MHz ***Reserved if the Rx Nss subfield is 1. |
| Rx Nss | If the Rx Nss Type subfield is 0, indicates the maximum number of***spatial streams that the STA can receive.*If the Rx Nss Type subfield is 1, indicates the maximum number of*spatial streams that the STA can receive as a beamformee in an SU PPDU using a beamforming steering matrix derived from a VHT Compressed Beamforming report with Feedback Type subfield indicating MU in the VHT Compressed Beamforming frame(s).*Set to 0 for $N_{SS}$ = 1*Set to 1 for $N_{SS}$ = 2 ... ***Set to 7 for $N_{SS}$ = 8 |
| Rx Nss Type | Set to 0 to indicate that the Rx Nss subfield carries the maximum number of spatial streams that the STA can receive.*****Set to 1 to indicate that the Rx Nss subfield carries the maximum number of spatial streams that the STA can receive as an SU PPDU using a beamforming steering matrix derived from a VHT Compressed Beamforming frame with the Feedback Type subfield indicating MU in the VHT Compressed Beamforming frame(s). |

The VHT operating mode field may be transmitted through a VHT operating mode notification action management frame. If an AP wishes to change a current BSS operating channel width, the AP may broadcast the VHT operating mode notification action management frame.

In accordance with an embodiment of the present invention, in order for a specific frequency band to be quieted using the VHT operating mode field, the VHT operating mode field further including quiet type information and AP quiet mode information may be transmitted.

FIG. 15 is a block diagram showing a format of the VHT operating mode field modified according to an embodiment of the present invention.

In accordance with an embodiment of the present invention, the modified VHT operating mode field may be transmitted through the beacon frame or the probe response frame. If the modified VHT operating mode field is transmitted through the beacon frame, there is an effect in that a larger number of STAs within a BSS may receive the message as compared with a method of sending the VHT operating mode field in the form of the existing action frame. This is because the number of STAs not receiving the action frame may be relatively greater than the number of STAs not receiving the beacon frame because the STAs not receiving the action frame may be in a sleep state on the related time.

Table 3 simply describes the setting and function of each of the quiet type subfield and the AP quiet mode subfield newly added to the modified VHT operating mode field.

TABLE 3

| Subfield | Description |
|---|---|
| Quiet Type | When the current operating channel width is 80 + 80 MHz, set to 1 if this VHT operating mode field is effective only for Quiet duration indicated by Quiet element. This indicates VHT STAs shall be quiet only on the secondary 80 MHz during Quiet duration.*****Set to 0 if this VHT operating mode field is immediately effective at all times. |
| AP Quiet Mode | When the current operating channel width is 80 + 80 MHz, set to 1 if AP-STA communications are allowed on the primary 80 MHz during Quiet duration, and set to 0 otherwise.*****When the current operating channel width is 20/40/80/160 MHz, the value is reserved to 0. |

An operation when the quiet type field is set to 0 is the same as that of the VHT operating mode field. That is, STAs within a BSS that have received the VHT operating mode field having its quiet type field set to 0 immediately change their BSS operating channel width. In this case, since the BSS operating channel width has been fully changed, the STAs interpret the changed operating channel width as the entire operating band when a quiet duration is reached and then perform a relevant operation.

If the quiet type field is set to 1, however, a change of the operating channel bandwidth means that it is limited to only quiet durations. Accordingly, VHT STAs quiet only in a secondary 80 MHz band for the quiet duration and may transmit and receive frames in a primary 80 MHz band.

The AP quiet mode field has the same function as the AP status flag field and the AP quiet mode field described in connection with the previous embodiment. That is, if a current operating channel width is a non-contiguous 80+80 MHz channel, when the AP quiet mode field is set to 1, it means that subsequent communication between an AP and an STA is permitted in the primary 80MHz for every quiet duration. If the AP quiet mode field is set to 0, subsequent communication between an AP and an STA is not permitted in the primary 80MHz, but only communication between an STA and an STA is performed for every quiet duration.

Figure 16:
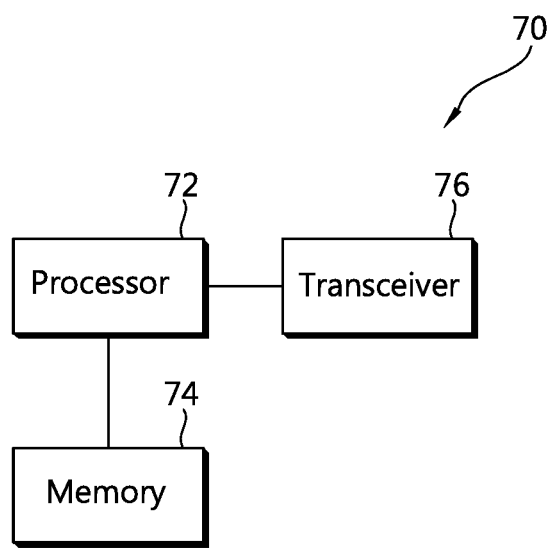
FIG. 16 is a block diagram showing a wireless apparatus to which the embodiments of the present invention may be applied.

FIG. 16 is a block diagram showing a wireless apparatus to which the embodiments of the present invention may be applied. The wireless apparatus 70 is a terminal capable of implementing the above-described embodiments and may be an AP, a non-AP STA which supports a broadband channel.

The wireless apparatus 70 includes a processor 72, memory 74, and a transceiver 76. The transceiver 76 may transmit and receive radio signals, and the physical layer of IEEE 802.11 is implemented in the transceiver 76. The processor 72 is functionally coupled to the transceiver 76, and it implements the MAC layer and the physical layer of IEEE 802.11. The processor 72 may be configured to generate a frame including the quiet channel element proposed by the present invention and send the frame or obtain control information by analyzing a value of the quiet channel element field included in a received frame. The processor 72 may be configured to implement the embodiments of the present invention.

The processor 72 or the transceiver 76 or both may include Application-Specific Integrated Circuits (ASICs), other chipsets, logic circuits and/or data processors. The memory 74 may include Read-Only Memory (ROM), Random Access Memory (RAM), flash memory, memory cards, storage media and/or other storage devices. When the above-described embodiment is implemented in software, the above-described scheme may be implemented using a module (process or function) that performs the above function. The module may be stored in the memory 74 and executed by the processor 72. The memory 74 may be placed inside or outside the processor 72 and connected to the processor 72 using a variety of well-known means.

A reduction in the utilization of a channel according to a change of a channel environment may be minimized by actively handling a change in the environment of some channels that form an operating channel in a WLAN system supporting an operating channel of a broadband.

The above-described embodiments of the present invention are only for illustrating the technical spirit of the present invention, and the technical spirit of the present invention should not be construed as being limited by the embodiments. The scope of the present invention is specified by the following appended claims.

What is claimed is:

1. A method for a wireless local area network, the method performed by an access point (AP) configured to communicate over a primary subchannel and a secondary subchannel, the method comprising:
    transmitting a frame including a quiet channel element to a receiving station,
    wherein the quiet channel element indicates that the secondary subchannel is to be quieted during a quiet interval in which the AP tests the secondary subchannel for a presence of radar transmissions and the receiving station does not send any frame to the AP,
    wherein the quiet channel element includes an AP quiet mode field having a single bit and indicating whether or not a communication to the AP is allowed within the primary subchannel during the quiet interval, and
    wherein each of the primary subchannel and the secondary subchannel has a bandwidth of 80 MHz; quieting the primary subchannel and the secondary subchannel during the quiet interval if the AP quiet mode field indicates that the communication to the AP is not allowed with the primary subchannel during the quiet interval; and
    quieting the secondary subchannel only during the quiet interval while communicating with the receiving station via the primary subchannel during the quiet interval if the AP quiet mode field indicates that the communication to the AP is allowed with the primary subchannel during the quiet interval,
    wherein the quiet channel element further includes information about the quiet interval only if the AP quiet mode field indicates that the communication to the AP is allowed within the primary subchannel during the quiet interval.

2. The method of claim 1, wherein the value of the AP quiet mode field is set to 1 to indicate that the communication to the AP is allowed within the primary subchannel, and
    wherein the value of the AP quiet mode field is set to 0 to indicate that the communication to the AP is not allowed within the primary subchannel.

3. The method claim 1, wherein the frame is a beacon frame or a probe response frame.

4. A device configured to communicate over a primary subchannel and a secondary subchannel in a wireless local area network, the device comprising:
    a transceiver; and
    a controller operatively connected to the transceiver and configured to:
    control the transceiver to transmit a frame including a quiet channel element to a receiving station,
    wherein the quiet channel element indicates that the secondary subchannel is to be quieted during a quiet interval in which the AP tests the secondary subchannel for a presence of radar transmissions and the receiving station does not send any frame to the AP, wherein the quiet channel element includes an AP quiet mode field having a single bit and indicating whether or not a communication to the AP is allowed within the primary subchannel during the quiet interval, and
    wherein each of the primary subchannel and the secondary subchannel has a bandwidth of 80 MHz;
    control the transceiver to quiet the primary subchannel and the secondary subchannel during the quiet interval if the AP quiet mode field indicates that the communication to the AP is not allowed with the primary subchannel during the quiet interval; and control the transceiver to quiet the secondary subchannel only during the quiet interval while communicating with the receiving station via the primary subchannel during the quiet interval if the AP quiet mode field indicates that the communication to the AP is allowed with the primary subchannel during the quiet interval, wherein the quiet channel element further includes information about the quiet interval only if the AP quiet mode field indicates that the communication to the AP is allowed within the primary subchannel during the quiet interval.

5. The device of claim 4, wherein the value of the AP quiet mode field is set to 1 to indicate that the communication to the AP is allowed within the primary subchannel, and wherein the value of the AP quiet mode field is set to 0 to indicate that the communication to the AP is not allowed within the primary subchannel.

6. The device claim 4, wherein the frame is a beacon frame or a probe response frame.

* * * * *